United States Patent
Suzuki

(10) Patent No.: US 7,515,197 B2
(45) Date of Patent: Apr. 7, 2009

(54) DIGITAL CAMERA CAPABLE OF OBTAINING CROP IMAGE

(75) Inventor: Hirobumi Suzuki, Kitakatsushika-gun (JP)

(73) Assignee: Nikon Corporation, Tokyo (JP)

( * ) Notice: Subject to any disclaimer, the term of this patent is extended or adjusted under 35 U.S.C. 154(b) by 561 days.

(21) Appl. No.: 10/992,674

(22) Filed: Nov. 22, 2004

(65) Prior Publication Data
US 2005/0117049 A1 Jun. 2, 2005

(30) Foreign Application Priority Data
Nov. 27, 2003 (JP) .............................. 2003-397458

(51) Int. Cl.
H04N 5/232 (2006.01)
H04N 5/262 (2006.01)
H04N 5/222 (2006.01)
(52) U.S. Cl. ................ 348/345; 348/240.2; 348/333.03
(58) Field of Classification Search ......... 348/346–349, 348/240.2, 333.03
See application file for complete search history.

(56) References Cited

U.S. PATENT DOCUMENTS

| | | | |
|---|---|---|---|
| 6,683,652 B1 * | 1/2004 | Ohkawara et al. | 348/347 |
| 6,906,746 B2 * | 6/2005 | Hijishiri et al. | 348/240.2 |
| 7,224,397 B2 * | 5/2007 | Sasaki | 348/348 |
| 2001/0022626 A1 | 9/2001 | Nozaki | |
| 2002/0057847 A1 * | 5/2002 | Hayashi et al. | 382/282 |
| 2003/0235410 A1 * | 12/2003 | Kurosawa | 396/109 |

FOREIGN PATENT DOCUMENTS

| | | |
|---|---|---|
| JP | A 9-274132 | 10/1997 |
| JP | A 11-331664 | 11/1999 |

* cited by examiner

*Primary Examiner*—David L Ometz
*Assistant Examiner*—Luong T Nguyen
(74) *Attorney, Agent, or Firm*—Oliff & Berridge, PLC

(57) ABSTRACT

An imaging section inputs rays of light from a subject through a lens and forms an image of the subject. A display screen of a display section displays an image of a subject focused by the lens. A focus area selecting section selects one of a plurality of focus areas displayed on the display screen. A focus adjusting section adjusts a focus on the subject in the selected focus area. A crop section automatically selects a crop area corresponding to the selected focus area and captures as a crop image an image in the selected crop area. The photographer can easily obtain a crop image by photographing a subject according to a conventional procedure.

17 Claims, 14 Drawing Sheets focus area focus area

DIGITAL CAMERA CAPABLE OF OBTAINING CROP IMAGE

CROSS-REFERENCE TO RELATED APPLICATIONS

This application is based upon and claims the benefit of priority from Japanese Patent Application No. 2003-397458, filed on Nov. 27, 2003, the entire contents of which are incorporated herein by reference.

BACKGROUND OF THE INVENTION

1. Field of the Invention

The present invention relates to a digital camera having a function for cropping a part of an image formed by an imaging device.

2. Description of the Related Art

The number of pixels of imaging devices used in digital cameras is being increased year after year. As a result, precise images and clearly enlarged prints can be obtained. A news photo that is inserted in a newspaper, a magazine, or the like is often created by cropping (cutting out) a part of an original image and enlarging the cropped image. When an image that has been formed is cropped, it needs a process time (edit time). Thus, for a news photo whose edit time necessary after it is photographed until it is reported (or inserted) should be as short as possible, it is desired to shorten the image process time for the crop process.

On the other hand, for example, Japanese Unexamined Patent Application Publication No. Hei 11-331664 proposes a digital camera that has a crop function for cutting out only an image in an area designated by a frame displayed on a display screen.

On the other hand, the amount of information of one image is increasing as the number of pixels is increasing. Thus, a memory that has a large capacity for such images is required. To reduce a memory area and increase the number of photographable images, the digital camera allows the user to select a record size or a compression rate of an image. The memory area can be also reduced by the foregoing crop function.

However, with a digital camera having the conventional crop function, the photographer should set an area to be cropped (hereinafter simply referred to as crop area). In reality, while observing a crop area that is displayed on a display screen such as a finder's screen or a liquid crystal display's screen, the photographer should set the crop area and photograph a subject. Thus, when the photographer photographs a speedy subject such as sports players or children who are moving around, the photographer may miss a shutter chance. In other words, when the photographer performs motion photography, it is difficult and impractical for the photographer to set a crop area in addition to various setting items such as a focus setting.

When the photographer performs motion photography at a news spot or the like, it is difficult for the photographer to use the crop function. Thus, after an image of a subject has been photographed, the photographed image should be processed so as to obtain a photographer's desired crop image. However, when the post-photographed image process is performed, it takes a long time after a desired image is cut out from an image of a subject until the cutout image is reported or inserted.

SUMMARY OF THE INVENTION

An object of the present invention is to allow a crop image of a subject to be easily obtained.

Another object of the present invention is to shorten the time necessary after a subject is photographed in motion photography until a desired image is cut out from the photographed image.

According to one of the aspects of the digital camera of the present invention, an imaging section receives rays of light from a subject through a lens and forms an image of the subject. A display section has a display screen displaying the image of the subject focused by the lens. A focus area selecting section selects one of a plurality of focus areas displayed on the display screen. A focus adjusting section adjusts a focus on the subject in the selected focus area. A crop section automatically selects a crop area corresponding to the selected focus area from a plurality of crop areas which correspond to the focus areas and are preset on the display screen, and captures an image in the selected crop area as a crop image in response to a capture request.

Thus, the digital camera according to the present invention automatically sets a crop area in accordance with a focus area that has been selected and captures a crop image. As a result, the photographer can easily obtain a crop image by photographing a subject in a conventional way without the need to consider setting a crop area. In other words, the photographer can easily crop an image of a subject. Since there is no need to secure the time to set a crop area before a subject is photographed, the photographer can properly photograph a subject without missing a shutter chance. In particular, the digital camera has a remarkable effect in photography for a speedy subject such as sports players and children who are moving around.

According to a preferable example of the above-described aspect of the digital camera of the present invention, the focus area selecting section has an area inputting section that causes the photographer to select one of the focus areas. Since the digital camera captures an image of a crop area corresponding to a focus area that the photographer has selected, the photographer only needs to perform a minimum operation for photography for a crop image. When setting a focus area, the photographer can recognize a crop area before performing photography and thus specifically recognize a crop image. As a result, the digital camera can easily obtain a crop image that the photographer desires.

According to a preferable example of the above-described aspect of the digital camera of the present invention, the focus area selecting section selects one of the focus areas that the distance between the subject in each of the focus areas and the digital camera is measured to be the shortest by the focus adjusting section. Thus, the focus adjusting section and the focus area selecting section automatically set a focus area and a crop area, and capture a crop image. Thus, in a scene of which speedy photography such as motion photography is required, the photographer can concentrate on chasing a subject on the display screen or on observing the appearance of the subject. As a result, the photographer can obtain a crop image without missing a shutter chance.

According to a preferable example of the above-described aspect of the digital camera of the present invention, a temperature detecting section detects the temperatures of subjects whose images are displayed in the focus areas. The focus area selecting section selects from the focus areas a focus area including an image of the subject having the highest temperature. Thus, the temperature detecting section and the focus area selecting section automatically set a focus area and a crop area, and capture a crop image. Thus, as with the third preferable example of the above-described aspect of the digital camera of the present invention, the photographer can obtain a crop image without missing a shutter chance.

According to a preferable example of the above-described aspect of the digital camera of the present invention, a visual line position detecting section detects the position of the visual line of the photographer who sees a screen (display screen) of a view finder. The focus area selecting section selects from the focus areas a focus area closest to the position of the visual line detected by the visual line position detecting section. Thus, the visual line position detecting section and the focus area selecting section automatically set a focus area and a crop area, and capture a crop image. Thus, as with the third preferable example of the above-described aspect of the digital camera of the present invention, the photographer can obtain a crop image without missing a shutter chance.

According to a preferable example of the above-described aspect of the digital camera of the present invention, a mode inputting section causes the photographer to select a crop photography mode or a crop and full screen photography mode. The crop section captures as the crop image an image in a crop area corresponding to the selected focus area when the crop photography mode has been selected with the mode inputting section. In addition, the crop section captures as the crop image an image in a crop area corresponding to the selected focus area and captures a full image displayed on the display screen when the crop and full screen photography mode has been selected with the mode inputting section. An image memory stores the image captured by the crop section.

When the photographer selects the crop & full screen photography mode with the mode inputting section, the digital camera according to the present invention can capture not only a crop image, but a full image displayed on the display screen. Thus, even in a case where the photographer has obtained a crop image that the photographer does not desire, the photographer can obtain a crop image that the photographer desires with a full image that the digital camera has photographed. When the photographer selects a proper photography mode in accordance with the remaining capacity of the image memory, the photographer can obtain an optimum crop image without missing a shutter chance.

According to a preferable example of the above-described aspect of the digital camera of the present invention, the crop section sets a compression rate of the full image to be higher than that of the crop image. In the crop & full screen photography mode, the digital camera according to the present invention captures a full image displayed on the display screen at a high compression rate. Thus, the capacity of the image memory can be saved.

According to a preferable example of the above-described aspect of the digital camera of the present invention, a mode inputting section causes the photographer to select a crop photography mode in which the crop image is stored in the image memory or a normal photography mode in which a full image corresponding to the image of the entire subject focused by the lens is stored in the image memory. The crop section stores as the crop image an image in a crop area corresponding to the selected focus area in the image memory, when the crop photography mode has been selected with the mode inputting section. In addition, the crop section stores the full image in the image memory when the normal photography mode has been selected with the mode inputting section. An image memory stores the image captured by the crop section.

Thus, the digital camera according to the present invention allows the photographer to freely select the crop photography mode or normal photography mode in accordance with the photographer's situation and obtain a crop image or a full image displayed on the display screen. For example, when the photographer selects the crop photography mode, time for the image process performed after the photography can be shortened. At that point, the capacity of the image memory can be also saved. When the photographer has ample time for the image process that the digital camera performs after the photography, the photographer can obtain a crop image that the photographer desires from a full image by selecting the normal photography mode.

BRIEF DESCRIPTION OF DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

Next, with reference to the accompanying drawings, embodiments of the present invention will be described.

First Embodiment

Figure 1:
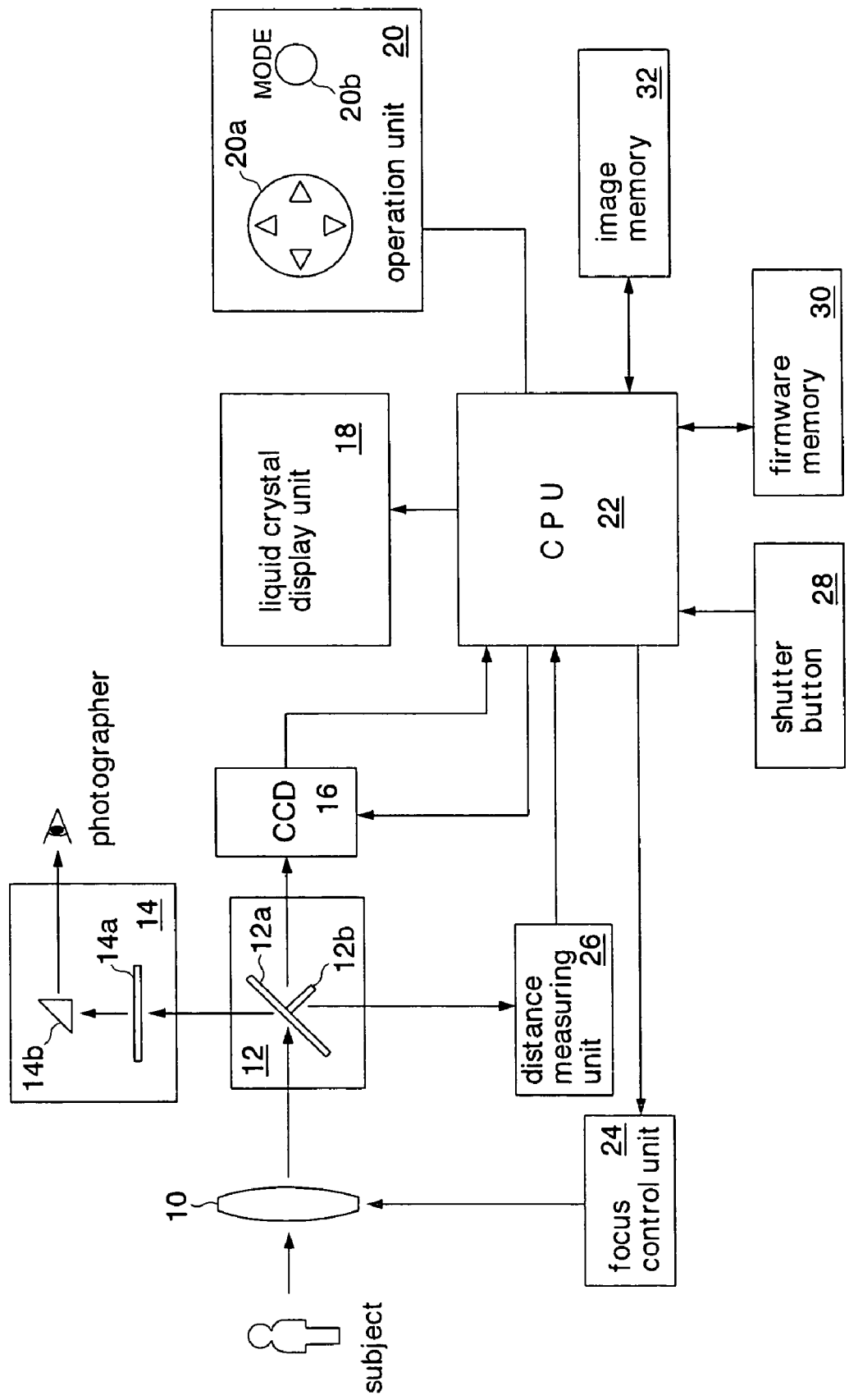
FIG. 1 is a block diagram showing a digital camera according to a first embodiment of the present invention.

FIG. 1 shows a digital camera according to a first embodiment of the present invention. The digital camera is a single lens reflex camera. The digital camera includes an exchangeable lens 10, a mirror unit 12, a view finder 14 (display section), a charge coupled device (CCD) 16 (imaging section), a liquid crystal display unit 18, an operation unit 20, a CPU 22, a focus control unit 24, a distance measuring unit 26, a shutter button 28, a firmware memory 30, and an image memory 32 (image memory).

In reality, the exchangeable lens 10 is composed of a plurality of lenses including a focus lens with which a subject is focused and a zoom lens with which the subject is zoomed. The mirror unit 12 has a mirror 12a that reflects rays of light emitted from a subject to the view finder 14 and a mirror 12b that reflects the rays of light emitted from the subject to the distance measuring unit 26. The mirror unit 12 is interposed between the exchangeable lens 10 and the CCD 16 so that the mirror unit 12 intercepts the optical path therebetween. When the shutter button 28 is pressed, the mirror unit 12 is moved toward a screen 14a under the control of the CPU 22 so as to secure the optical path from the exchangeable lens 10 to the CCD 16.

The view finder 14 has the foregoing screen 14a (display screen) that displays an image of a subject focused by the lens 10 and a prism 14b that causes the photographer to recognize the image of the subject displayed on the screen 14a. In addition, the screen 14a also displays a graphic pattern (such as a focus area that will be described later). The graphic pattern is output from a display output unit (not shown).

Opposite to the lens 10, the CCD 16 is disposed with mirror 12a in between. On an imaging surface of the CCD 16, the image of the subject is received, the image being focused by the lens 10.

The liquid crystal display unit 18 is composed of a liquid crystal panel, a driver circuit that drives the liquid crystal panel, and so forth (they are not shown). The liquid crystal panel is disposed in the rear of the digital camera (opposite a mounting member of the lens 10). On the liquid crystal panel of the liquid crystal display unit 18, an image formed by the CCD 16 is displayed when the shutter button 28 is pressed. Before the shutter button 28 is pressed, the image of the subject is displayed on the screen 14a of the view finder 14 through the mirror 12a.

The operation unit 20 has a so-called cross button 20a and a mode button 20b with which the photographer sets various modes such as a photography mode of the digital camera. The operation unit 20 is disposed near the shutter button 28 in the rear of the digital camera.

The focus control unit 24 drives a motor (not shown) that moves the lens 10 in the direction of the optical axis so as to focus the image of the subject. The distance measuring unit 26 measures the distance from the subject to the digital camera in accordance with rays of light emitted from the subject through the mirror 12b. The focus control unit 24 and the distance measuring unit 26 operate under the control of the CPU 22. When the photographer presses the shutter button 28, the shutter button 28 outputs a capture request to the CPU 22 so as to cause the CCD 16 to capture the image of the subject. The CPU 22 causes the mirrors 12a and 12b to jump up and drive the CCD 16 in response to the capture request.

The firmware memory 30 is for example a mask ROM or a flash memory. The firmware memory 30 stores firmware (program) that the CPU 22 executes so as to operate the digital camera. The memory 30 may be substituted with an internal ROM disposed in the CPU 22. The image memory 32 is for example an external memory device such as a flash memory card. The image memory 32 stores an image of a subject formed by the CCD 16. The digital camera also has a RAM (work memory) that temporarily stores image data formed by the CCD 16.

Figure 2:
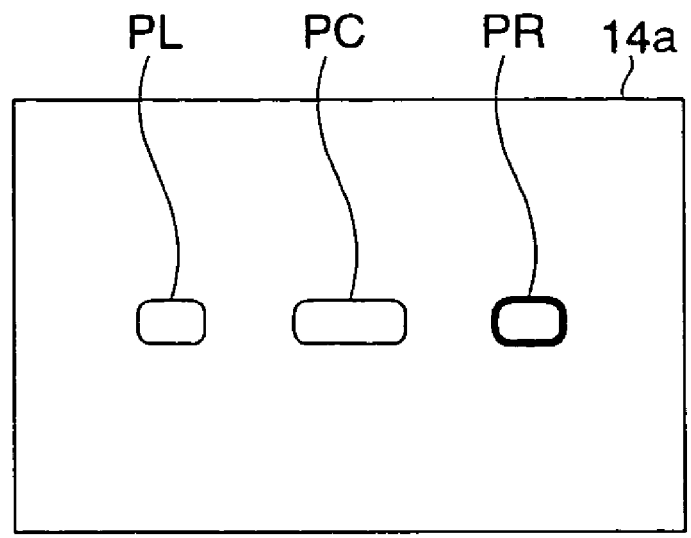
FIG. 2 is a plan view showing details of a screen shown in FIG. 1.

FIG. 2 shows details of the screen 14a shown in FIG. 1. On the screen 14a is displayed a subject through the mirror 12a. While the power supply of the digital camera is turned on, three focus areas PL, PC, and PR that the display output unit outputs are horizontally displayed in the center of the screen 14a.

Before photographing the subject, the photographer who looks in the view finder 14 selects one of the focus areas PL, PC, and PR. In reality, whenever the photographer presses a left side triangle mark or a right side triangle mark of the cross button 20a shown in FIG. 1, the focus area is cyclically selected from PL to PC to PR. Frames that represent non-selected focus areas are displayed in black. A selected focus area (PR in FIG. 2) is displayed in red by the display output unit. In FIG. 2, the selected focus area PR, which is displayed in red by the display output unit, is represented by a solid line.

When the CPU 22 executes the program and detects the state that the cross button 20a has been pressed, the focus area PL, PC, or PR is set. Thus, the CPU 22 and the cross button 20a function as a focus area selecting section and an area inputting section that cause the photographer to select one of the focus areas PL, PC, and PR, which is displayed on the screen 14a. In reality, as shown in FIG. 3 to FIG. 5, on the screen 14a, a crop area is displayed in accordance with a selected focus area during a crop photography mode that will be described later.

Figure 6:
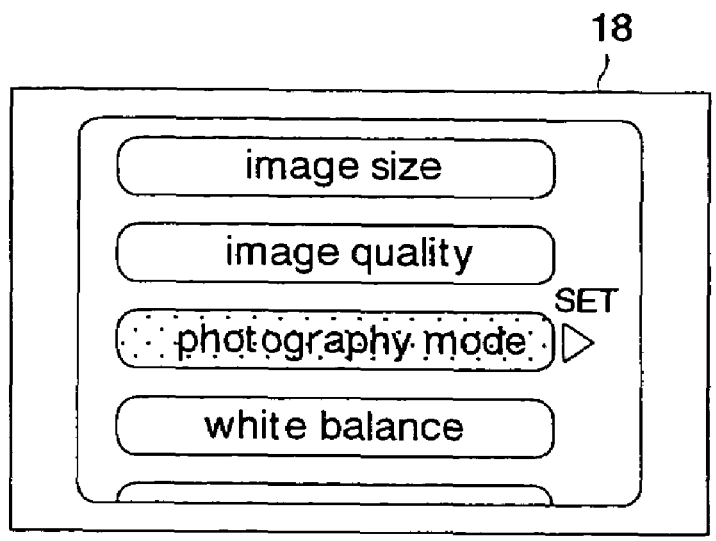
FIG. 6 is a plan view showing the screen displayed on a liquid crystal display unit in the case that various modes are set according to the first embodiment of the present invention.

As described in FIG. 6, Japanese Unexamined Patent Application Publication No. Hei 9-274132, titled Focus Detecting Apparatus for Measuring Multiple Distances (translated title), when a digital camera has three focus detecting optical systems in accordance with focus areas PL, PC, and PR and the relation of the positions of a pair of images formed by each sensor is obtained for each optical system, the focus areas PL, PC, and PR can be quickly and securely focused.

Figure 3:
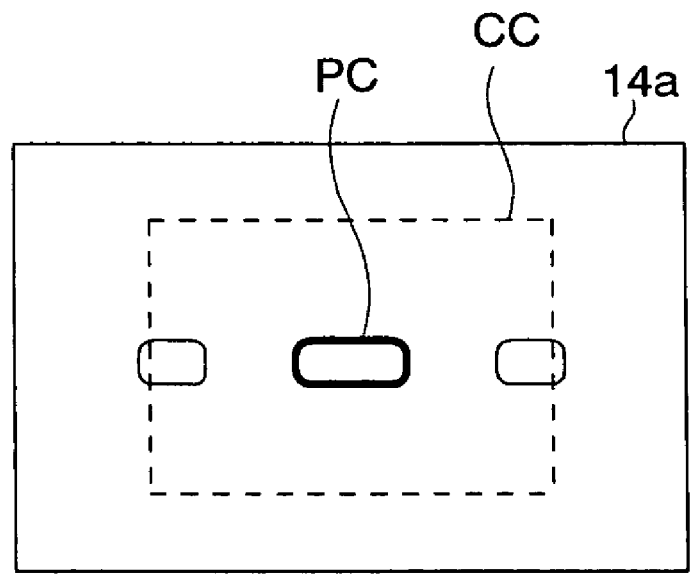
FIG. 3 is a plan view showing the screen in the case that a center focus area has been selected.

FIG. 3 shows the screen 14a in the case that the center focus area PC has been selected during the crop photography mode. On the screen 14a, a crop area CC is displayed. The crop area CC represents a predetermined range containing the focus area PC. The crop area CC is denoted by for example a black broken line. The crop area CC is displayed by the display outputting unit. At that point, the other non-selected crop areas are not displayed. The crop area CC represents a range that the CCD 16 captures when the digital camera photographs a subject. The aspect ratio (ratio of the number of pixels in the vertical direction and the number of pixels in the horizontal direction) of the crop area CC has been set to the same value as that of a full image photographed during the normal photography mode with all effective pixels of the CCD 16. During the normal operation mode, the crop area CC is not displayed, but only the focus areas PL, PC, and PR.

Figure 4:
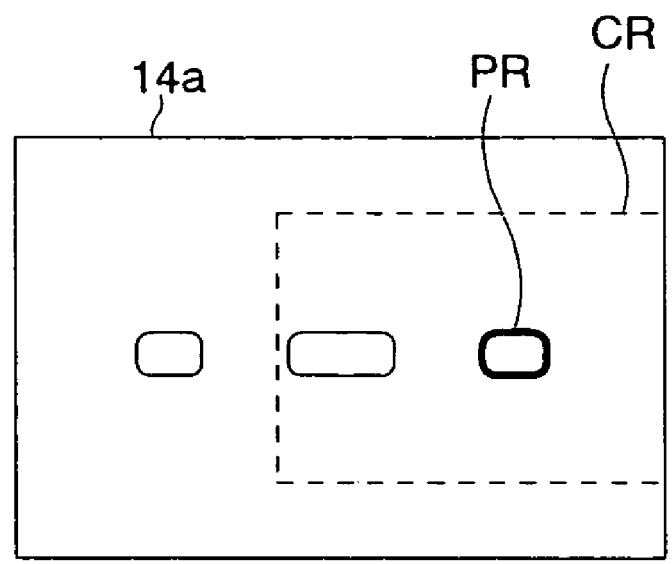
FIG. 4 is a plan view showing the screen in the case that a right side focus area has been selected.
Figure 5:
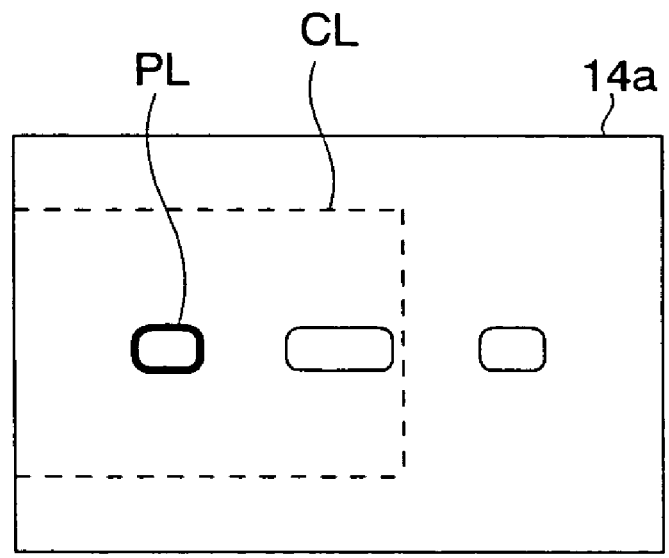
FIG. 5 is a plan view showing the screen in the case that a left side focus area has been selected.

FIG. 4 shows the screen 14a in the case that the right side focus area PR has been selected during the crop photography mode. On the screen 14a, a crop area CR is displayed. The crop area CR represents a predetermined range containing the focus area PR. The crop area CR is denoted by for example a black broken line. The size of the crop area CR is the same as the size of the crop area CC. Thus, in the example, the center of the crop area CR is slightly leftward shifted from the center of the focus area PR. During the normal operation mode, the crop area CR is not displayed, but only the focus areas PL, PC, and PR.

FIG. 5 shows the screen 14a in the case that the left side focus area PL has been selected during the crop photography mode. On the screen 14a, a crop area CL is displayed. The crop area CL represents a predetermined range containing the focus area PL. The crop area CL is represented by for example black broken line. The size of the crop area CL is the same as the size of each of the crop areas CC and CR. Thus, in this example, the center of the crop area CL is slightly rightward shifted from the center of the focus area PL. During the normal operation mode, the crop area CL is not displayed, but only the focus areas PL, PC, and PR.

FIG. 6 shows a screen that is displayed on the liquid crystal panel of the liquid crystal display unit 18 when various modes are set according to the first embodiment. The CPU 22 performs the mode setting process by executing the mode setting program. The screen shown in FIG. 6 is displayed when the photographer presses a mode button 20b of the operation unit 20. While the screen shown in FIG. 6 is displayed, when the photographer presses the mode button 20b again, the CPU 22 completes the mode setting process. Then, the CPU 22 causes the liquid crystal display unit 18 to stop displaying the current screen or display a default screen.

In FIG. 6, a shaded setting item represents an item that the photographer has selected. When the CPU 22 has detected the state that the photographer has pressed an upper triangle mark or a lower triangle mark of the cross button 20a, the CPU 22 causes a selected item to move upward or downward, respectively. When "image quality" has been selected, if the photographer presses the lower triangle mark of the cross button 20a, "image quality" is deselected and "photography mode" is newly selected. On the right of the selected item, a set button SET is displayed. While the screen shown in FIG. 6 is displayed, if the photographer presses the right side triangle mark of the cross button 20a, the CPU 22 recognizes that the set button SET has been pressed and switches the screen shown in FIG. 6 to a screen for the photography mode.

Figure 7:
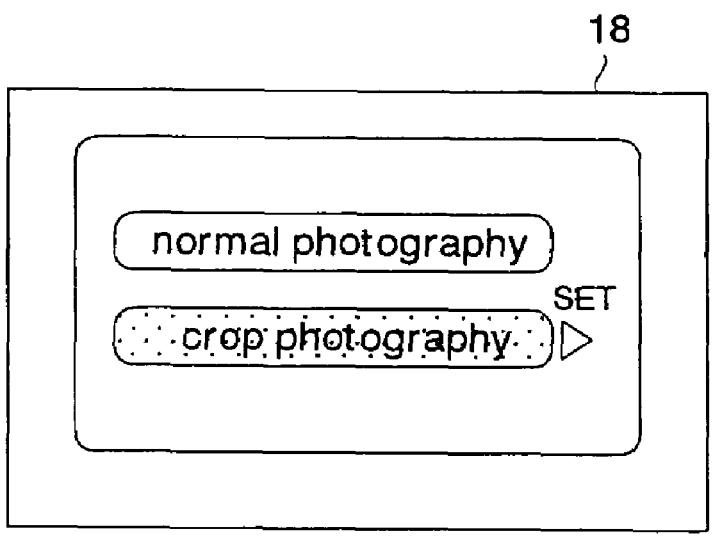
FIG. 7 is a plan view showing a screen displayed on the liquid crystal display unit in the case that a photography mode is set according to the first embodiment of the present invention.

FIG. 7 shows a screen that is displayed on the liquid crystal panel of the liquid crystal display unit 18 in the case that the photography mode is set according to the first embodiment. On the screen, the photographer presses the upper or lower triangle mark of the cross button 20a so as to select the normal photography mode or crop photography mode. On the right side of the selected item, the set button SET is displayed. For example, after having selected the crop photography mode as shown in FIG. 7, when the photographer presses the right side triangle mark of the cross button 20a, the CPU 22 recognizes that the set button SET has been pressed and sets the crop photography mode for the digital camera. On the liquid crystal display unit 18, the mode setting screen shown in FIG. 6 is displayed. The CPU 22 performs these selecting operation and displaying operation by executing the program. Thus, the CPU 22 and the cross button 20a function as a mode inputting section that causes the photographer to select the normal photography mode or crop photography mode.

Figure 8:
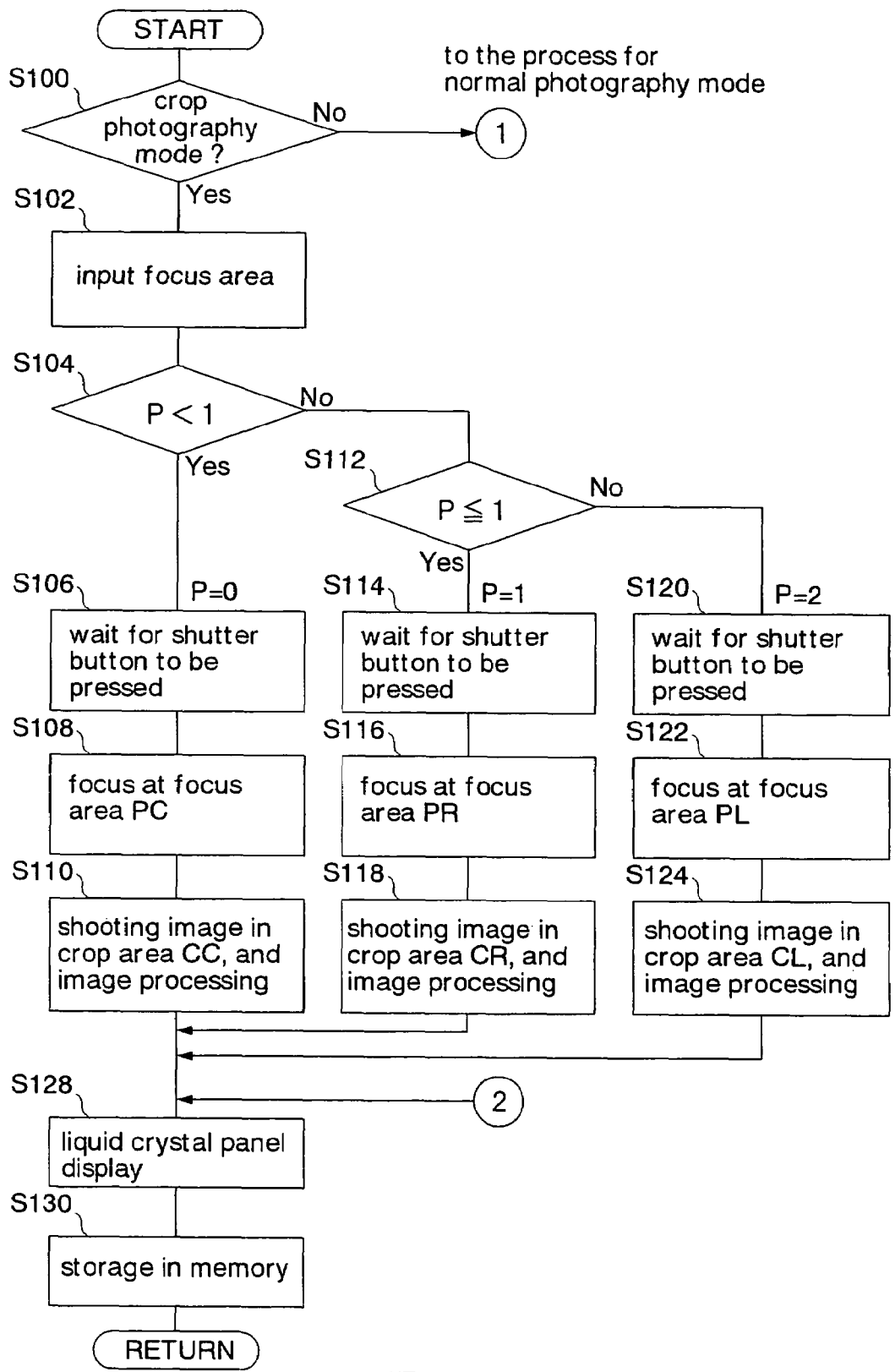
FIG. 8 is a flow chart showing an operation in a crop photography mode of the digital camera according to the first embodiment of the present invention.

FIG. 8 shows an operation during the crop photography mode of the digital camera according to the first embodiment. The CPU 22 controls the operation shown in FIG. 8 by executing the program.

First of all, at step S100, the CPU 22 determines whether or not the photography mode that has been set is the crop photography mode. When the crop photography mode has been set, the flow advances to step S102. When the crop photography mode has not been set, the CPU 22 starts the process for the normal photography mode (see FIG. 9).

At step S102, the CPU 22 waits until the photographer inputs (sets) a focus area. While observing a subject on the screen 14a of the view finder 14, the photographer sets one of the focus areas PL, PC, and PR. When the focus area that has been set is PC, PR, or PL, the CPU 22 substitutes "0," "1," or "2" into the parameter P, respectively. Thereafter, the flow advances to step S104.

At step S104, the CPU 22 determines whether or not the parameter P is "0." When the parameter P is "0," the flow advances to step S106. When the parameter P is not "0," the flow advances to step S112.

At step S106, the CPU 22 waits until the photographer presses the shutter button 28. When the CPU 22 has determined that the shutter button 28 has been pressed, the flow advances to step S108.

At step S108, the CPU 22 controls the focus control unit 24 in accordance with the distance from the digital camera to the image that is displayed in the focus area PC, the distance being obtained by the distance measuring unit 26, and focuses the image displayed in the focus area PC. Thus, the CPU 22, the distance measuring unit 26, and the focus control unit 24 function as a focus adjusting section that focuses an image that is displayed in the selected focus area PC. Thereafter, the flow advances to step S110.

At step S110, the CPU 22 drives the CCD 16 so as to write image data corresponding to the crop area CC of the image data that the CCD 16 has scanned to the image storing memory 32. In other words, the image in the crop area CC corresponding to the selected focus area (this image is referred to as crop image data) is captured. Thereafter, the CPU 22 compresses the crop image data at a predetermined compression rate (this process is referred to as image process) and writes the compressed crop image to the memory 32. Thereafter, the flow advances to step S128.

Thereafter, at step S112, the CPU 22 determines whether or not the parameter P is "1." When the parameter P is "1," the flow advances to step S114. When the parameter P is not "1," the flow advances to step S120.

The process performed from step S114 to S118 is almost the same as the process performed from S106 to S110 except that the selected focus area is PR and the CCD 16 scans pixels in accordance with the crop area CR. After step S118, the flow advances to step S128.

The process performed from step S120 to S124 is almost the same as the process performed from step S106 to S110 except that the focus area is PL and the CCD 16 scans pixels in accordance with the crop area CL. After step S124, the flow advances to step S128.

Thus, the CPU 22 and the CCD 16 function as a crop section that selects a crop area corresponding to a selected focus area and captures an image as a crop image in the selected crop area when the shutter button 28 is pressed.

At step S128, the CPU 22 causes the liquid crystal display unit 18 to display a photographed crop image or a full image obtained at step S158 shown in FIG. 9 (described later) until the shutter button 28 is pressed or until the mode button 20b is pressed. Unless any operation is performed for a predetermined period (for example, 10 seconds later), after the predetermined period has elapsed, the CPU 22 causes the liquid crystal display unit 18 to stop displaying the photographed crop image. While the liquid crystal display unit 18 displays the image, the flow advances to step S130. At step S130, the CPU 22 causes the image memory 32 to store the crop image formed by the CCD 16. Thereafter, the CPU 22 completes the photography operation.

Alternatively, a focus area selected when the shutter button 28 has been half pressed may be focused. An image in a crop area corresponding to a focus area selected when the shutter button 28 has been fully pressed may be photographed.

Figure 9:
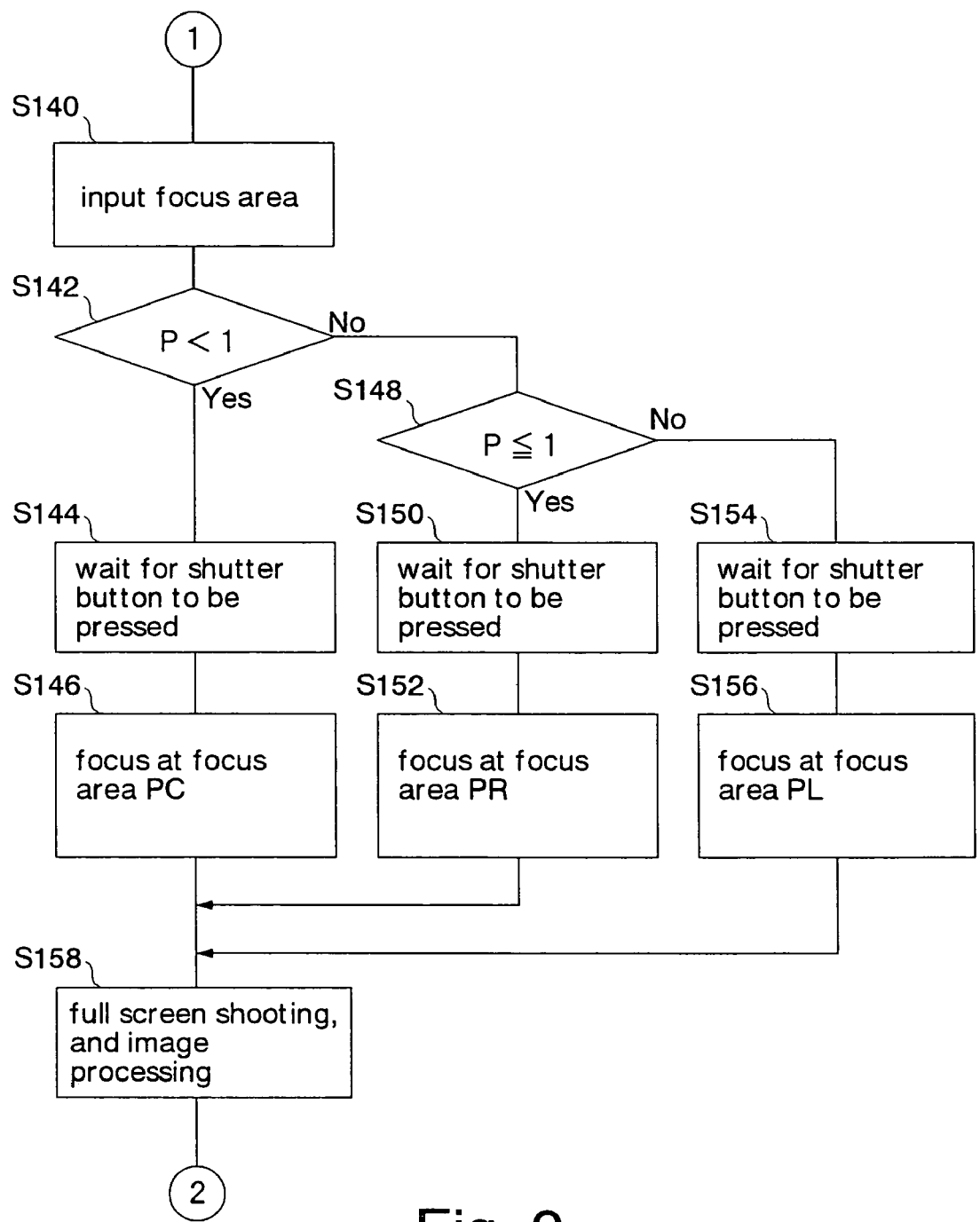
FIG. 9 is a flow chart showing an operation in a normal photography mode of the digital camera according to the first embodiment of the present invention.

FIG. 9 shows an operation in the normal photography mode of the digital camera according to the first embodiment. The CPU 22 controls the operation shown in FIG. 9 by executing the program. In FIG. 9, the description of steps that are same as those shown in FIG. 8 will be omitted. At step s100 shown in FIG. 8, when the CPU 22 has determined that the photography mode have not been the crop photography mode, namely the normal photography mode, the flow advances to step S140. Steps S140, S142, S144, S146, S148, S150, S152, S154, and S156 are the same as steps S102, S104, S106, S108, S112, S114, S116, S120, and S122 shown in FIG. 8, respectively. In other words, the CPU 22 causes an image in a focus area that the photographer has set to be focused when the shutter button 28 is pressed. After the image has been focused at one of steps S146, S152, and S156, the flow advances to step S158.

At step S158, the CPU 22 causes the CCD 16 to scan pixels that correspond to all photography area (full screen) and that are displayed on the screen 14a and reads full image data that are displayed on the screen 14a. Thereafter, the flow advances to step S128 shown in FIG. 8.

According to the foregoing embodiment, since a crop area is automatically selected in accordance with a focus area that the photographer selects, the photographer can obtain a crop image by normally photographing a subject without considering setting of the crop area. Thus, the photographer can easily crop an image of a subject without need to perform a complicated operation.

Before performing photography, it is not necessary for the photographer to set a crop area. Thus, the photographer will not miss a so-called shutter chance. In particular, when a speedy subject such as sports players or children who are moving around is photographed, a remarkable effect can be achieved.

Since the foregoing embodiment is ideal for photography that requires speediness, when motion photography is performed at a news spot or the like, a crop image can be easily obtained using the crop function. As a result, time necessary after a subject is photographed until a desired image is cut out and reported or published can be minimized.

Since the photographer can recognize a crop area before photographing a subject, the photographer can recognize a real image that the photographer desires to crop. As a result, the photographer can easily obtain his or her desired crop image with a simple operation.

According to the foregoing embodiment, the photographer can freely select the crop photography mode or the normal photography mode in accordance with the photographer's condition. When the photographer selects the crop photography mode, the photographer can quickly perform an image process after the photography. At that point, the capacity of the image memory 32 can be saved. If the photographer has ample time for the image process after the photography, when the photographer selects the normal photography mode, the photographer can obtain a desired crop image from a full image by the image process after the photography.

Second Embodiment

Figure 10:
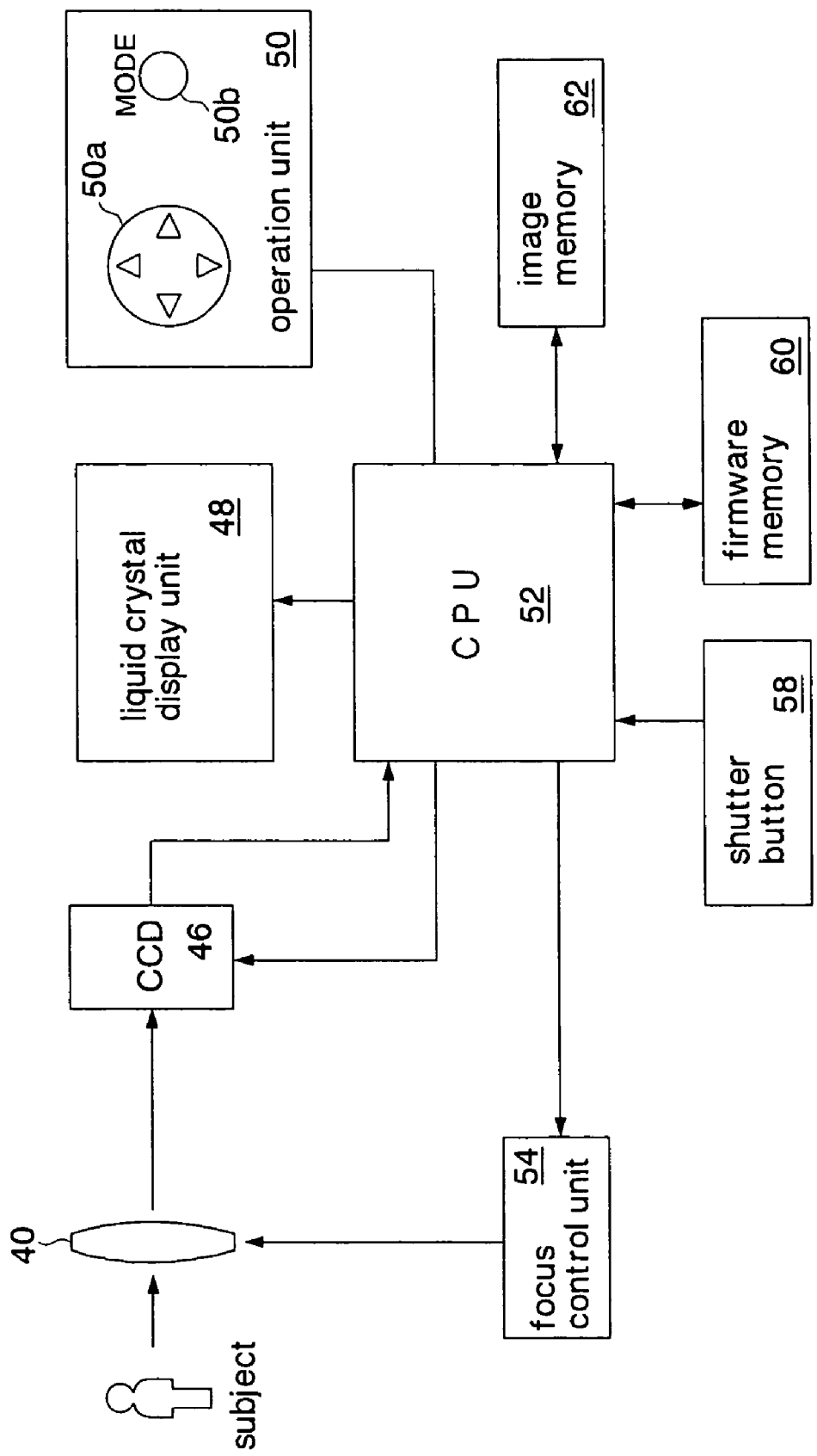
FIG. 10 is a block diagram showing a digital camera according to a second embodiment of the present invention.

FIG. 10 shows a digital camera according to a second embodiment of the present invention. In FIG. 10, the same elements as those described in the first embodiment are denoted by the reference numerals and their detailed description will be omitted. The digital camera according to the second embodiment is a so-called compact digital camera. The digital camera includes a lens 40, a CCD 46 (imaging section), a liquid crystal display unit 48, an operation unit 50, a CPU 52, a focus control unit 54, a shutter button 58, a firmware memory 60, and an image memory 62 (image memory). The functions of these elements are almost the same as the functions of the elements of the first embodiment except that a pre-photographed image of a subject is displayed in the liquid crystal display unit 48. Since the digital camera uses a contrast detecting system of which a subject is focused in accordance with the state of the contrast of an image formed by the CCD 46, the function of a distance measuring unit is accomplished by a program that the CPU 52 executes.

The digital camera has a function for automatically setting a focus area. The digital camera captures an image of a crop area corresponding to a focus area that the digital camera has automatically set when the shutter button is pressed (detected as a capture request). A liquid crystal panel (display screen) of the liquid crystal display unit 48 displays not only a photographed image and a various-mode setting menu, but the foregoing pre-photographed image. Thus, the focus areas PL, PC, and PR shown in FIG. 2 are displayed on the liquid crystal panel.

Figure 11:
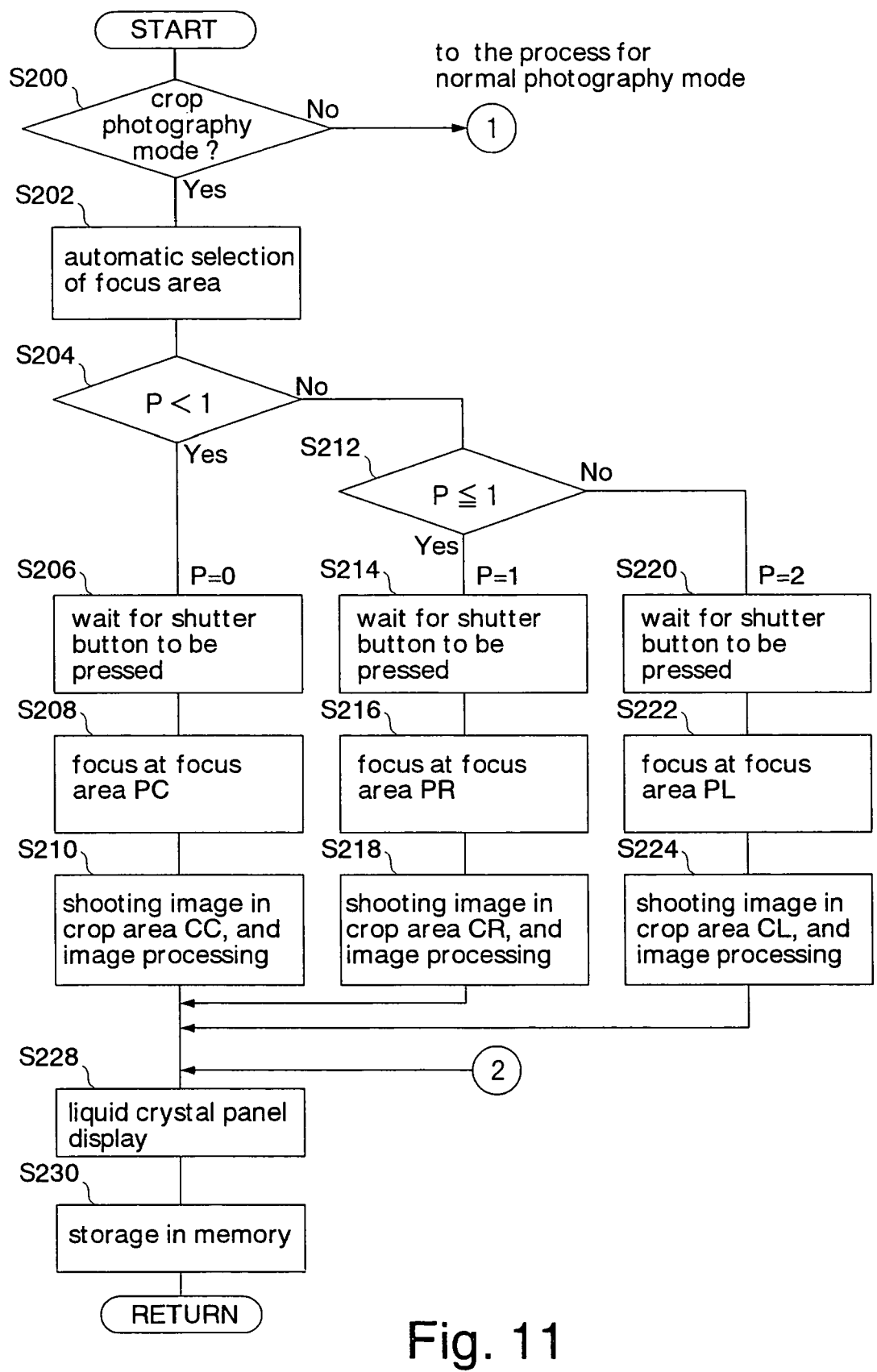
FIG. 11 is a flow chart showing an operation in a crop photography mode of the digital camera according to the second embodiment of the present invention.

FIG. 11 shows a crop photography operation of the digital camera according to the second embodiment. In FIG. 11, detailed description of steps that are same as steps shown in FIG. 8 will be omitted. FIG. 11 shows the process in which the crop photography mode has been set as shown in FIG. 6 and FIG. 7. The CPU 52 controls the operation shown in FIG. 11 by executing the program. The process performed from steps S200 to S230 excluding step S202 is the same as the process performed from steps S100 to S130 excluding step S102 according to the first embodiment except that an image of a pre-photographed subject is displayed on the liquid crystal display unit 48.

At step S200, when the CPU 52 has recognized that the crop photography mode has been set, the flow advances to step S202. When the CPU 52 has not recognized that the crop photography mode has been set, the CPU 52 performs the process for the normal photography mode (at step S140) shown in FIG. 9. After the CPU 52 has completed the process of the normal photography mode, the flow returns to step S228.

At step S202, the CPU 52 automatically selects a focus area. In reality, the CPU 52 selects a focus area corresponding to an image closest to the camera from the three focus areas PL, PC, and PR (FIG. 2) displayed on the liquid crystal panel of the liquid crystal display unit 48. For example, using the contrast detecting system, the CPU 52 selects a focus area from the focus areas PL, PC, and PR in such a manner that the distance between the subject in each of the focus areas PL, PC, and PR and the camera is calculated and a focus area of which the distance is the shortest is selected. In more detail, the CPU 52 successively moves the focus lens to the focus areas PL, PC, and PR in such a manner that the contrast of an image in each of the focus areas PL, PC, and PR becomes the maximum. At that point, the CPU 52 calculates the photography distances of the images in the focus areas PL, PC, and PR in accordance with the position information of the focus lens. The position information of the focus lens is output from an encoder (not shown in FIG. 1) that detects the position of the focus lens. In accordance with the calculated photography distances, the CPU 52 selects one of the focus areas (PL, PC, and PR) in such a manner that the distance from the subject in each of the focus areas and the camera is calculated and a focus area of which the distance is the shortest is selected. Thus, the CPU 52 and the liquid crystal display unit 48 function as a focus area selecting section that automatically selects one of the focus areas PL, PC, and PR. When the selected focus area is PC, PR, or PL, the CPU 52 substitutes "0," "1," or "2" into the parameter P, respectively. Thereafter, as with the first embodiment, the CPU 52 executes steps S204 to S230 in accordance with the focus area that has been set. Thereafter, the CPU 52 completes the crop photography operation.

According to the second embodiment, the same effect as the first embodiment can be obtained. In addition, according to the second embodiment, a focus area can be automatically set in accordance with an image formed by the CCD 46. An image of a crop area corresponding to the focus area that has been set can be automatically captured. Thus, in a scene of which the photographer should quickly photograph a subject such as motion photography, the photographer can concentrate in pursuing the subject displayed on the liquid crystal panel or observing the appearance of the subject. As a result, since the load of the operation that the photographer should perform can be alleviated, the photographer can obtain a crop image without missing a shutter chance.

Third Embodiment

Figure 12:
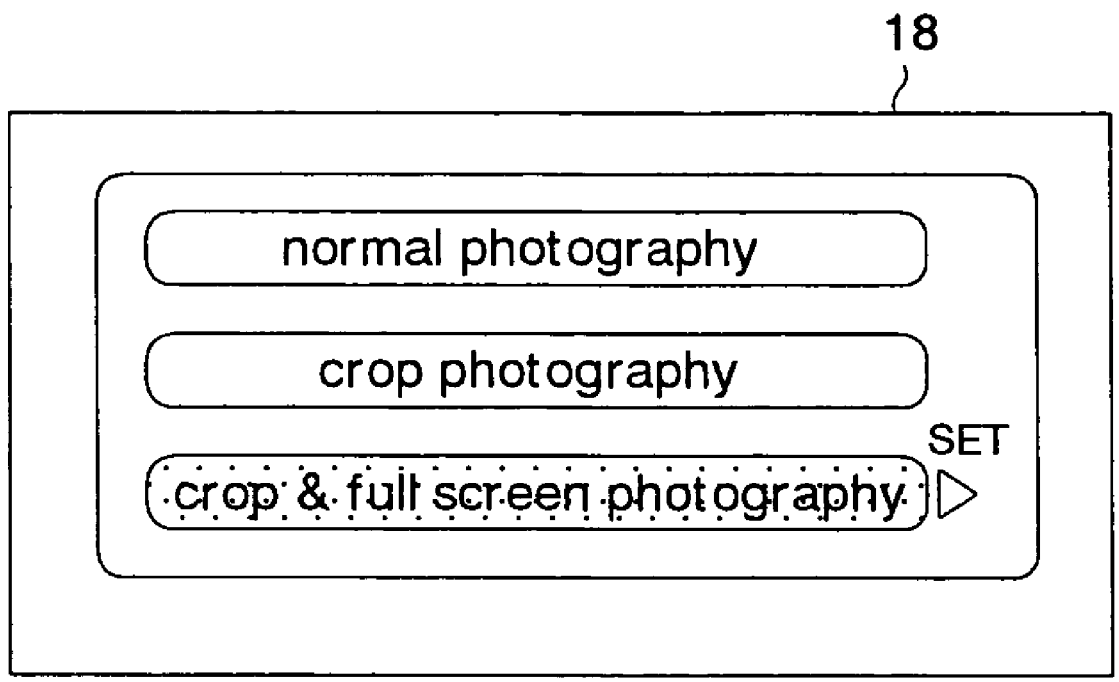
FIG. 12 is a plan view showing a screen displayed on a liquid crystal display unit in the case that a photography mode is set in a digital camera according to a third embodiment of the present invention.

FIG. 12 shows a screen displayed on a liquid crystal display unit in the case that a photography mode is set in a digital camera according to a third embodiment of the present invention. In FIG. 12, the same elements as those in the first embodiment are denoted by the same reference numerals and their detailed description will be omitted. The structure of the third embodiment is the same as the structure of the first embodiment except for the program that the CPU 22 shown in FIG. 1 executes and that is stored in the firmware memory 30. In other words, the digital camera according to the third embodiment is a single lens reflex digital camera.

The screen shown in FIG. 12 is displayed when the photographer selects the photography mode in FIG. 6. On the screen, by pressing the upper triangle mark or lower triangle mark of the cross button 20a shown in FIG. 1, the photographer selects one of a normal photography mode, a crop photography mode, and a crop & full screen photography mode. While having selected the crop & full screen photography mode, when the photographer presses the right side triangle mark of the cross button 20a, the CPU 22 recognizes that the set button SET has been pressed and sets the crop & full screen photography mode for the photography mode of the digital camera. On the liquid crystal display unit 18, the mode setting screen shown in FIG. 6 is displayed. Thus, the CPU 22 and the cross button 20a function as a mode inputting section that causes the photographer to select one of the normal photography mode, the crop photography mode, and the crop & full screen photography mode.

Figure 13:
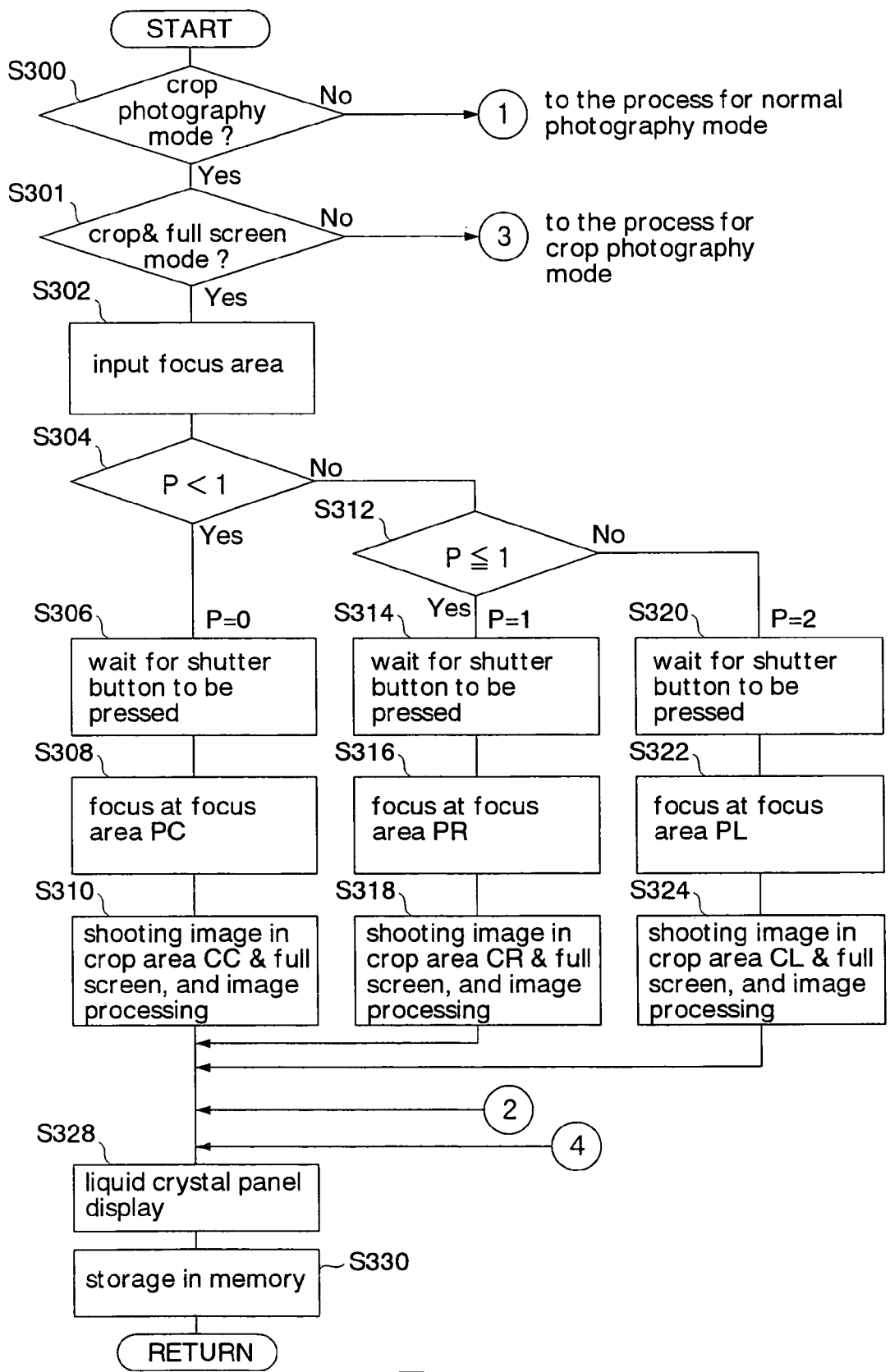
FIG. 13 is a flow chart showing a crop & full screen photography operation of the digital camera according to the third embodiment of the present invention.

FIG. 13 shows the crop & full screen photography operation of the digital camera according to the third embodiment. In FIG. 13, detailed description of the same steps as those shown in FIG. 8 will be omitted. The CPU 22 controls the operation shown in FIG. 13 by executing the program. The process performed from steps S300 to s330 except for steps S301, S310, S318, S324, S328, and S330 is the same as the process performed from steps S100 to S130 except for steps S110, S118, S124, S128, and S130 according to the first embodiment (FIG. 8).

At step S300, when the CPU 22 has recognized that the crop photography mode has been set, the flow advances to step S301. When the CPU 22 has not recognized that the crop photography mode has been set, the CPU 22 recognizes that the normal photography mode has been set and performs the process for the normal photography mode shown in FIG. 9 (at step S140) shown in FIG. 9. After the CPU 22 has performed the process for the normal photography mode, the flow advances to step S328.

At step S301, when the CPU 22 has recognized that the crop & full screen photography mode has been set, the flow advances to step S302. When the CPU 22 has not recognized that the crop & full screen photography mode has been set, the CPU 22 recognizes that the regular crop photography mode has been set and performs the process for the crop photography mode shown in FIG. 14. After the CPU 22 has performed the process for the crop photography mode, the flow returns to step S328.

Thereafter, as with the first embodiment, at step S302, the CPU 22 waits until the photographer inputs a focus area. At steps S304 and S312, the CPU 22 determines what focus area has been selected. Thereafter, the CPU 22 executes the process from steps S306 to S308, the process from steps S314 to S316, or the process from steps S320 to S322 in accordance with the focus area that has been input. After the CPU 22 has focused the predetermined focus area at step S308, S316, or S322, the flow advances to step S310, S318, or S324, respectively.

At step S310, the CPU 22 causes the CCD 16 to scan pixels that corresponds to the full photography area (full screen) and that are displayed on the screen 14a and reads full image data corresponding to the full photography area. Thereafter, the CPU 22 cuts out image data (crop image) corresponding to the crop area CC from the full image data. Thereafter, the CPU 22 compresses the full image data and the crop image data so that the compression rate for the full image data is higher than the compression rate for the crop image data. The CPU 22 temporarily stores the compressed full image data and crop image data to a work memory.

As with step S310, at step S318, the CPU 22 captures full image data displayed on the screen 14. The CPU 22 cuts out image data corresponding to the crop area CR from the full image data. As with step S310, the CPU 22 compresses the full image data and the crop image data and temporarily stores them to a work memory. Likewise, at step S324, the CPU 22 compresses the full image data and image data corresponding to the crop area CL that is cut out from the full image data and temporarily stores them to the work memory. After step S310, S318, or S324, the flow advances to step S328.

As with step S128 shown in FIG. 8, at step S328, when the photography mode is the normal photography mode or the crop photography mode, the CPU 22 causes the liquid crystal display unit 18 to display the photographed image. When the photography mode is the crop & full screen photography mode, the CPU 22 causes the liquid crystal display unit 18 to display the full image corresponding to the photographed full screen. In addition, the CPU 22 causes the liquid crystal display unit 18 to display a frame that represents the selected crop area in the full image. Thus, the photographer can recognize which focus area has been selected and from which crop area a crop image has been photographed. Thereafter, the flow advances to step S330.

At step S330, when the photography mode is the normal photography mode, the CPU 22 causes the image memory 32 to store the photographed full image. When the photography mode is the crop photography mode, the CPU 22 causes the memory 32 to store the photographed crop image. When the photography mode is the crop & full screen photography mode, the CPU 22 causes the memory 32 to store the photographed full image and the crop image. At that point, since the full screen has been compressed at a high compression rate, the capacity of the memory 32 can be saved. Thereafter, the CPU 22 completes the process.

Figure 14:
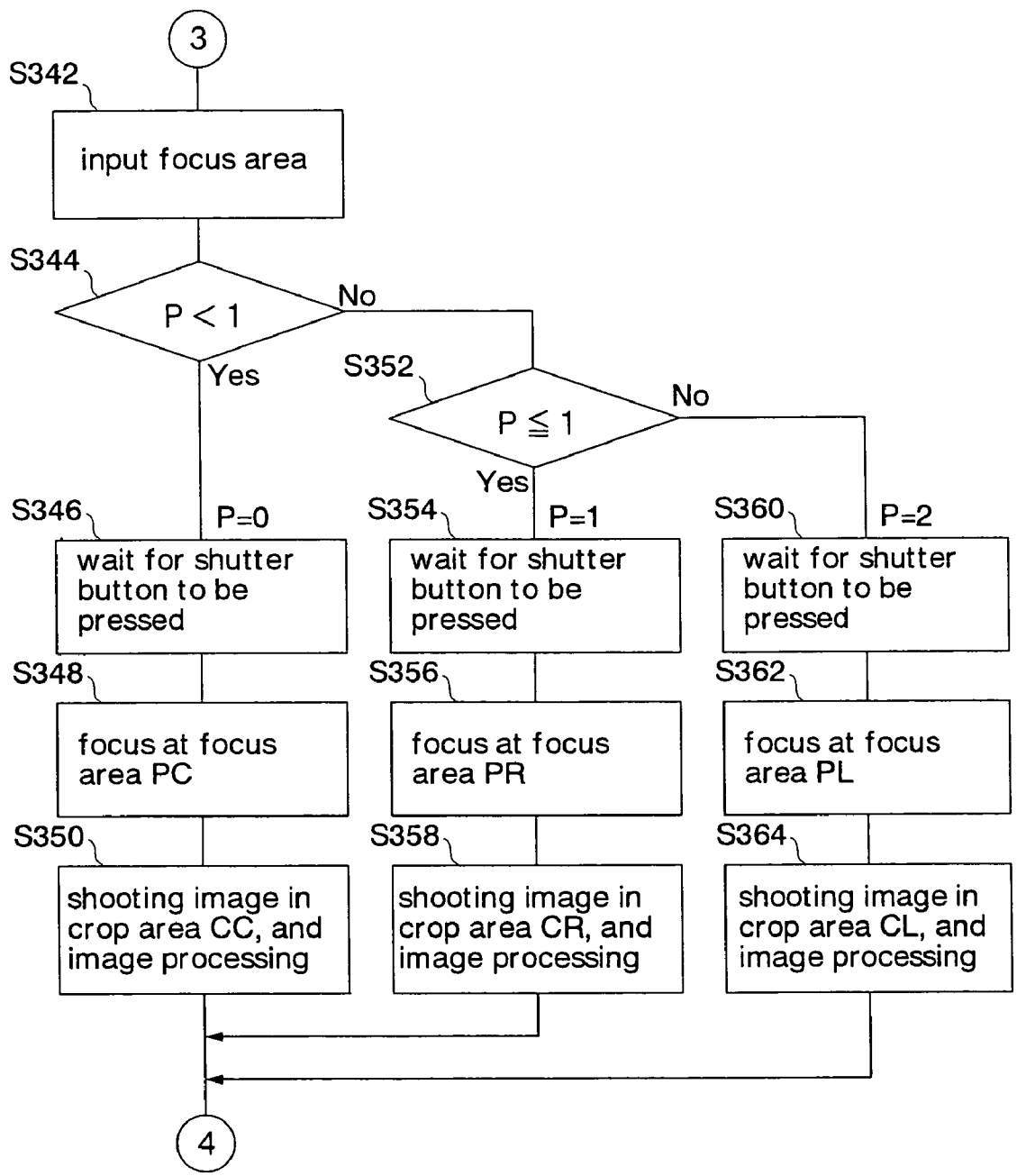
FIG. 14 is a flow chart showing a crop photography operation of the digital camera according to the third embodiment of the present invention.

FIG. 14 shows the crop photography operation of the digital camera according to the third embodiment. Since the process (from steps S342 to S364) of the crop photography operation is the same as the process (from steps S102 to S124) shown in FIG. 8 according to the first embodiment, its description will be omitted. After step S350, S358, or S364, the flow advances to step S328 shown in FIG. 13.

According to the third embodiment, the same effect as the first embodiment can be obtained. According to the third embodiment, when the crop & full screen photography mode is selected, not only a crop image, but full image data corresponding to a full photography area displayed on the screen 14a can be captured. Thus, if a crop image that the photographer does not intend to capture is obtained, a crop image that the photographer intends to capture can be obtained using a full image by the image process performed after the photography. In this case, when data of which full image data have been reversibly compressed are recorded in the memory 32, an accurate full image having the same accuracy as the photographed image can be reproduced in the image process performed after the photography.

When a photography mode is selected in accordance with the remaining capacity of the image memory 32, the photographer can obtain an optimum crop image without missing a shutter chance. In addition, since full image data displayed on the screen 14a is compressed at a high compression rate, the memory area of the memory 32 can be saved.

Figure 15:
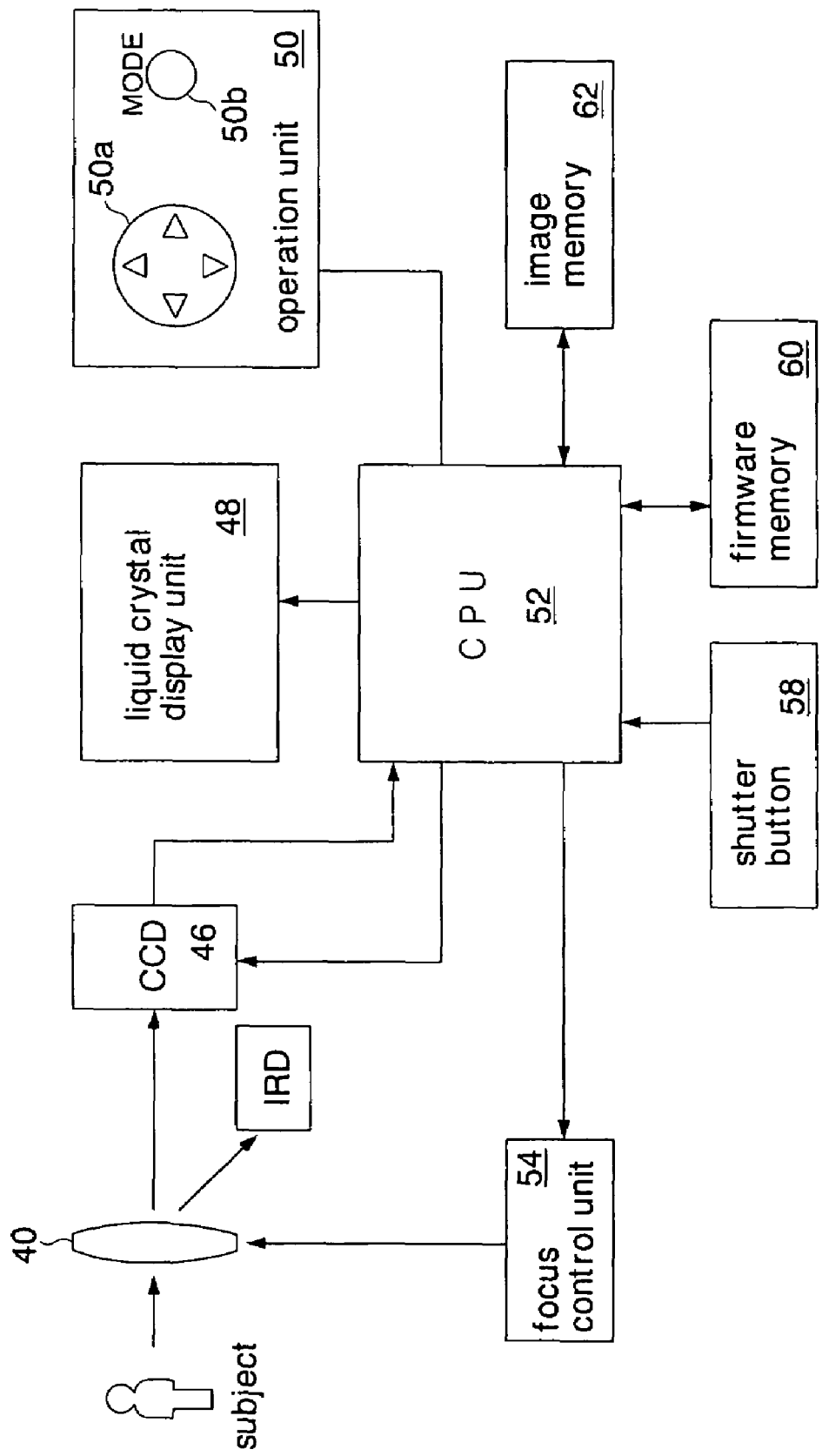
FIG. 15 is a block diagram showing another example of selecting a crop area.

According to the second embodiment, an image of a crop area corresponding to one of the focus areas PL, PC, and PR is captured as a crop image in such a manner that the distance between an image (subject) in each of the focus areas PL, PC, and PR and the camera is calculated and a focus area of which the distance is shortest is selected. However, the present invention is not limited to such an embodiment. Alternatively, as shown in FIG. 15, the digital camera may have an infrared detector IRD (temperature detecting section) that detects infrared rays emitted from a subject. In this case, an image of a crop area corresponding to a focus area having an image detected by the infrared ray detector IRD as the highest temperature image is captured as a crop image. Alternatively, a predetermined range containing an image detected by the infrared ray detector IRD as the highest temperature image may be set as a crop area regardless of a focus area. In this case, the image is captured as a crop image. In this case, the same effect as the second embodiment can be obtained.

Figure 16:
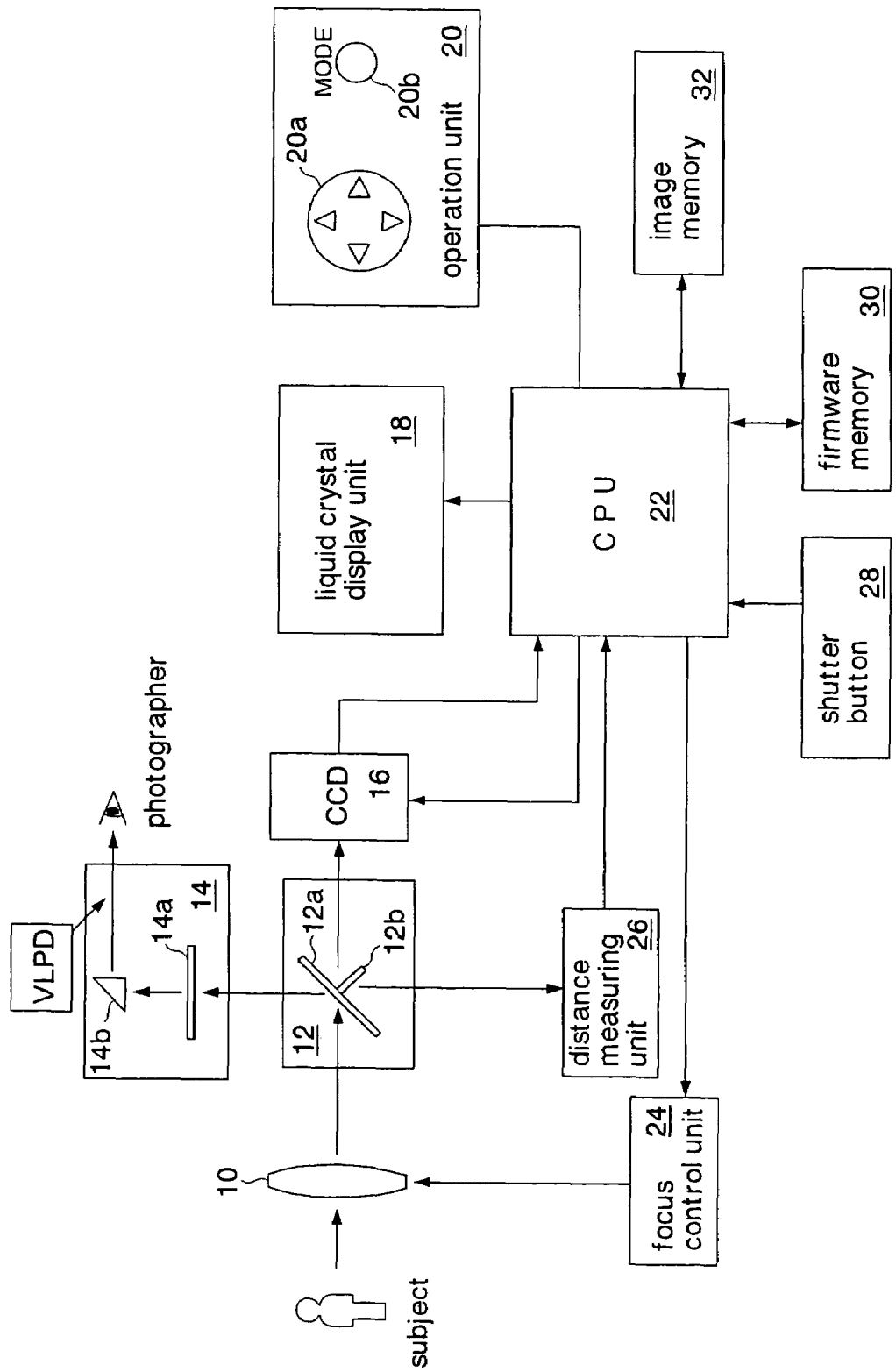
FIG. 16 is a block diagram showing another example of selecting a crop area.

Alternatively, as shown in FIG. 16, the single lens reflex digital camera may have a visual line position detecting section VLPD that detects the position of the visual line of the photographer who sees a screen in a view finder. In this case, when the shutter button is pressed, an image of a crop area corresponding to a focus area closest to the position of the visual line detected by the visual line position detecting section VLPD is captured as a crop image. Alternatively, a predetermined range including the position of the visual line detected by the visual line position detecting section VLPD when the shutter button is pressed may be set as a crop area regardless of a focus area. A crop image of the crop area can be captured. In this case, the same effect as the second embodiment can be obtained.

Figure 17:
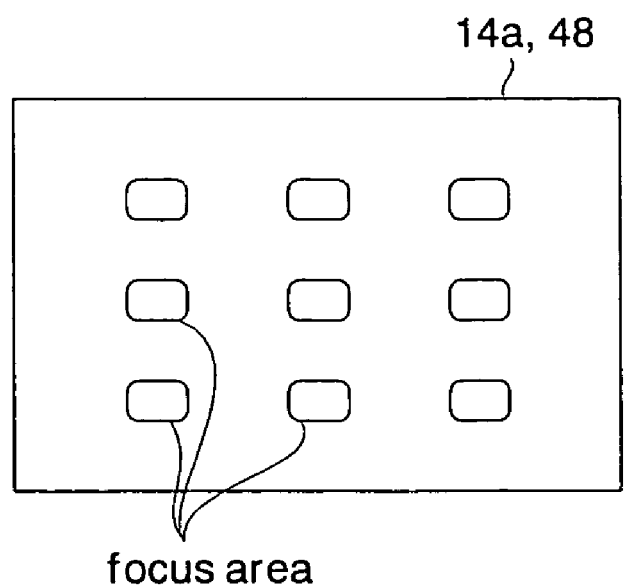
FIG. 17 is a schematic diagram describing another setting example of a focus area.
Figure 18:
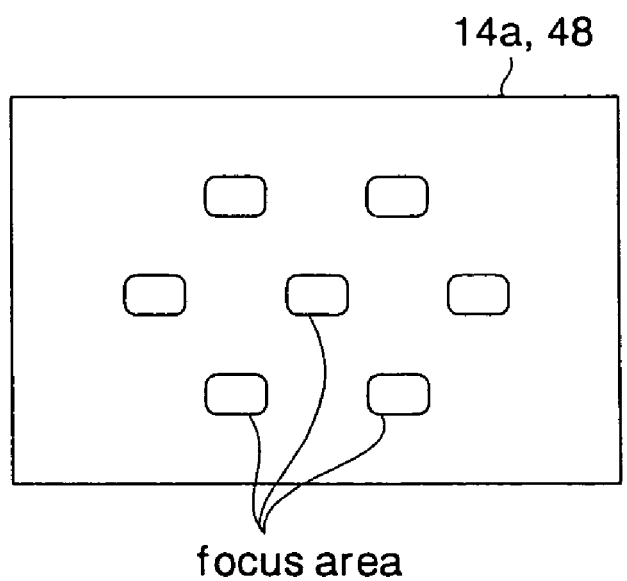
FIG. 18 is a schematic diagram describing another setting example of a focus area.

According to the second embodiment, a focus area is selected from the focus areas PL, PC, and PR in such a manner that the distance between an image (subject) in each of the focus areas and the camera is calculated and a focus area of which the distance is the shortest is selected. An image of a crop area according to the selected focus area is photographed. However, the present invention is not limited to such an embodiment. Alternatively, a focus area containing an image having predetermined colors may be detected. In this case, an image of a crop area corresponding to the focus area may be photographed. Alternatively, a focus area containing an image having the strongest contrast may be detected. In this case, an image of a crop area corresponding to the focus area may be photographed. In this case, the same effect as the second embodiment can be obtained. According to the foregoing embodiments, three focus areas PL, PC, and PR are set in the horizontal direction of the photography area displayed on the screen 14a of the view finder 14 or the liquid crystal display unit 48 of the view finder 14. However, the present invention is not limited to the foregoing embodiments. For example, as shown in FIG. 17, nine focus areas of a matrix of 3×3 may be set. Alternatively, as shown in FIG. 18, focus areas may be set in such a manner that the number of focus areas at the center of the photography area is larger than the number of focus areas on each of the upper side and the lower side of the photography area. At that point, the same number of crop areas as the number of focus areas is set.

The foregoing embodiments describe an example of which the center focus area PC is wider than each of the other focus areas PL and PR. However, the present invention is not limited to the foregoing embodiments. Alternatively, the sizes of all the focus areas PL, PC, and PR may be the same.

According to the first and third embodiments, the present invention is applied to a single lens reflex digital camera. However, the present invention is not limited to such an example. In other words, the present invention can be applied to a compact digital camera.

According to the second embodiment, the present invention is applied to a compact digital camera. The present invention is not limited to such an example. In other words, the present invention can be applied to for example a single lens reflex digital camera.

According to the second embodiment, the focus areas PL, PC, and PR are focused in accordance with the contrast detecting system. However, the present invention is not limited to such an example. In other words, as described in the first embodiment, when three focus detecting optical systems corresponding to the three focus areas PL, PC, and PR are disposed, the distances between the focus areas PL, PC, and PR and the subject can be measured at a time.

According to the foregoing embodiments, the present invention is applied to a digital camera that uses a CCD as an imaging device. However, the present invention is not limited to such an example. In other words, the present invention can be applied to a digital camera that uses a CMOS sensor as an imaging sensor.

In addition, the present invention may be applied to a digital camera function of portable equipment such as a cellular phone, a personal digital assistance (PDA) and to a digital camera function of a video camera.

The invention is not limited to the above embodiments and various modifications may be made without departing from the spirit and scope of the invention. Any improvement may be made in part or all of the components.

What is claimed is:

1. A digital camera, comprising:
an imaging section that receives rays of light from a subject and forms an image of the subject;
a display section that has a display screen displaying the image of the subject;
a focus area selecting section that selects one of a plurality of focus areas displayed on the display screen;
a focus adjusting section that adjusts a focus on the subject in the selected focus area; and a crop section that automatically selects a crop area corresponding to the selected focus area from a plurality of crop areas which correspond to the focus areas and are preset on the display screen, and the crop section captures an image in the selected crop area as a crop image in response to a capture request.

2. The digital camera as set forth in claim 1, wherein the imaging section outputs only image data corresponding to the image in the selected crop area in response to the capture request.

3. The digital camera as set forth in claim 1, wherein the focus area selecting section has an area inputting section causing a photographer to select one of the focus areas.

4. The digital camera as set forth in claim 1, wherein the focus area selecting section selects from the focus areas such a focus area that a distance between the subject in each of the focus areas and the digital camera is measured to be the shortest by the focus adjusting section.

5. The digital camera as set forth in claim 1, further comprising a temperature detecting section that detects temperatures of subjects whose images are displayed in the focus areas, and wherein the focus area selecting section selects from the focus areas a focus area including an image of the subject having the highest temperature.

6. The digital camera as set forth in claim 1, further comprising:
a view finder that has a screen; and
a visual line position detecting section that detects the position of the visual line of a photographer who sees the screen, and wherein
the display screen corresponds to the screen of the view finder, and
the focus area selecting section selects from the focus areas a focus area closest to the position of the visual line detected by the visual line position detecting section.

7. The digital camera as set forth in claim 1, wherein the focus area selecting section calculates contrast of an image corresponding to each of the focus areas formed by the imaging section and selects one of the focus areas where the contrast of the image shows a maximum value.

8. The digital camera as set forth in claim 1, wherein the focus area selecting section determines whether or not the image corresponding to each of the focus areas formed by the imaging section includes a predetermined color, and selects one of the focus areas including the predetermined color.

9. The digital camera as set forth in claim 1, wherein the imaging section concurrently forms and obtains the crop image and a full image which corresponds to an image of an entire subject.

10. The digital camera as set forth in claim 9, wherein the crop section sets a compression rate of the full image to be higher than that of the crop image.

11. The digital camera as set forth in claim 9, further comprising
an image memory that stores images captured by the crop section, wherein
the crop section reversibly compresses data of the full image to store in the image memory.

12. The digital camera as set forth in claim 9, further comprising
an image memory that stores images captured by the crop section, and wherein
the imaging section forms the full image, and
the crop section extracts data of the crop image from the full image based on the selected focus area, and stores the full image and the crop image data in the image memory.

13. The digital camera as set forth in claim 1, further comprising:
a mode inputting section that causes a photographer to select one of a crop photography mode and a crop and full screen photography mode; and
an image memory that stores images captured by the crop section, wherein
the crop section captures as the crop image an image in a crop area corresponding to the selected focus area when the crop photography mode has been selected with the mode inputting section, and
the crop section captures as the crop image an image in a crop area corresponding to the selected focus area and captures a full image displayed on the display screen when the crop and full screen photography mode has been selected with the mode inputting section.

14. A digital camera, comprising:
an imaging section that receives rays of light from a subject and forms an image of the subject;
a display section that has a display screen displaying the image of the subject;
a focus area selecting section that selects one of a plurality of focus areas;
a focus adjusting section that adjusts a focus on the subject in the selected focus area; and
a crop section that automatically selects a crop area corresponding to the selected focus area from a plurality of crop areas which correspond to the focus areas and are preset on the display screen, and the crop section captures the image in the selected crop area as a crop image in response to a capture request;
the display screen also displaying the focus area selected by the focus area selecting section, and a mark showing the crop area corresponding to the selected focus area.

15. The digital camera as set forth in claim 14, wherein the crop areas are partially overlapped with each other.

16. The digital camera as set forth in claim 14, further comprising:
an image memory that stores images captured by the crop section; and
a mode inputting section that causes a photographer to select one of a crop photography mode in which the crop image is stored in the image memory and a normal photography mode in which a full image corresponding to the image of an entire subject is stored in the image memory, wherein
the crop section stores as the crop image an image in a crop area corresponding to the selected focus area in the image memory, when the crop photography mode has been selected with the mode inputting section, and
the crop section stores the full image in the image memory when the normal photography mode has been selected with the mode inputting section.

17. The digital camera as set forth in claim 16, wherein the display section displays the mark showing the crop area corresponding to the selected focus area during the crop photography mode, and stops displaying the mark during the normal photography mode.

* * * * *